United States Patent [19]
Frye

[11] Patent Number: 5,565,652
[45] Date of Patent: Oct. 15, 1996

[54] ELECTRICAL POWER TRANSMISSION LINE

[76] Inventor: Filmore O. Frye, 42 W. Blaine St., McAdoo, Pa. 18237

[21] Appl. No.: 377,793

[22] Filed: Jan. 24, 1995

[51] Int. Cl.⁶ .................................................. H02G 5/06
[52] U.S. Cl. ............................................. 174/24; 174/28
[58] Field of Search ................................... 174/24, 12 R, 174/14 R, 28, 21 R

[56] References Cited

U.S. PATENT DOCUMENTS

| | | | |
|---|---|---|---|
| 2,410,802 | 11/1946 | Bain | 174/28 |
| 2,759,988 | 8/1956 | Eaton | 174/28 |
| 3,345,450 | 10/1967 | Spindle | 174/28 |
| 3,356,785 | 12/1967 | Yoshida et al. | 174/28 |
| 3,639,864 | 2/1972 | Klostermark | 339/96 |
| 3,944,716 | 3/1976 | Katzbeck et al. | 174/21 R |
| 4,047,166 | 9/1977 | Miller et al. | 340/261 |
| 4,412,094 | 10/1983 | Dougherty et al. | 174/110 F X |
| 4,415,763 | 11/1983 | Cookson | 174/28 |
| 4,458,102 | 7/1984 | White | 174/43 X |
| 4,605,283 | 8/1986 | Stanton | 350/127 X |
| 4,667,061 | 5/1987 | Ishikawa et al. | 174/14 R |
| 5,094,735 | 3/1992 | Lang, Jr. | 204/288 |
| 5,203,378 | 4/1993 | Williams | 138/109 |
| 5,345,520 | 9/1994 | Grile | 385/15 |

FOREIGN PATENT DOCUMENTS 0318019  12/1988  Japan .................................. 505/885 X

*Primary Examiner*—Kristine L. Kincaid
*Assistant Examiner*—Chau N. Nguyen
*Attorney, Agent, or Firm*—Richard C. Litman

[57] ABSTRACT

An electrical power transmission line is particularly adapted for the transmission of electrical power from relatively small and remotely located hydroelectric sites and over rugged terrain. The line has a plurality of conducting elements, preferably assembled from copper tubing or pipe with loosely fitting slip joints to allow for thermal expansion, with concentric outer insulating elements of polyvinyl chloride pipe or tubing, which insulating elements are hermetically sealed together. The conducting element is spaced apart from the inner walls of the insulating element by plural spacers installed therebetween, to provide an air gap between conductor and insulator. The use of a combination of standard, off the shelf components provides a relatively economical construction, with the relatively light weight of the components providing for shipment by air to remote sites and the standardization of the components providing for ease of assembly in remote areas by relatively unskilled labor using minimal hand tools and equipment, without need for the construction of a right of way for a conventional electrical power line. A method of constructing such a line is also disclosed.

18 Claims, 5 Drawing Sheets

ELECTRICAL POWER TRANSMISSION LINE

FIELD OF THE INVENTION

The present invention relates generally to electrical power lines, and more specifically to a line particularly adapted to be constructed from readily available, off the shelf components for carriage by relatively small aircraft to assembly sites in relatively rugged and inaccessible terrains. The present power transmission line is particularly adapted for use with smaller hydroelectric generating systems, which do riot require large dams and other labor and material intensive systems or plants.

BACKGROUND OF THE INVENTION

Hydroelectric power, where electrical power is generated by means of generators or dynamos powered by the force of falling water turning a turbine wheel, is used to generate a relatively small percentage of the electrical power used in North America. A major reason for this is that by their very nature, the best sites for such hydroelectric power plants are in relatively rugged terrain with relatively large elevation changes, in order to provide the fall necessary to produce sufficient water force to spin the turbine(s) efficiently.

Such terrain floes not generally provide for ease of travel thereover Almost by definition, such country is generally relatively remote, thus making it technically difficult not only to construct dams and associated hydroelectric power generating plants, but also to construct the required electrical transmission lines from the remote power generation site.

Most hydroelectric power systems are located in the western part of the U. S. and Canada, where the terrain is favorable for large scale hydroelectric generating systems. However, many other areas are suitable for such hydroelectric power generation, but are precluded from consideration for major dams and plants either due to the remoteness of the site, or the relatively small elevation changes of the terrain. Many such sites are easily adaptable to smaller, relatively easily transportable generators, turbines, and penstocks, which apparatus may be transported by air to remote sites, thus eliminating any need for roads and associated support facilities to be constructed for a major hydroelectric project.

However, the problem still exists to transmit economically the electrical power generated by such smaller and remote sites, to other areas where it is needed. Conventional overhead electrical power lines are generally unsatisfactory, due to the need to clear a right of way through possibly heavily forested and rugged terrain. While such construction may be economically feasible for the transmission of larger amounts of power from larger generation sites, clearly the erection of such power line technology adapted for the transmission of massive amounts of power is unsuitable for use with smaller, low head generators capable of providing only relatively small amounts of power.

Accordingly, the need arises for an electrical power transmission line which may be easily assembled from readily available, off the shelf components and is particularly adapted for use in remote and rugged terrain. The components must be readily transportable by air, and capable of assembly without need to construct graded or otherwise formed rights of way, and without need for sophisticated technology or tools, by workers in the field.

DESCRIPTION OF THE PRIOR ART

U.S. Pat. No. 2,410,802 issued to John C. Bain on Nov. 12, 1946 discloses a Concentric Conductor Transmission Line wherein both concentric portions are conductors, rather than the inner electrically conductive portion and surrounding outer electrically insulating portion of the present transmission line. Bain also provides passages through the outer conductor to access the inner conductor, whereas the outer insulating portion of the present invention is preferably completely sealed. Bain is particularly adapted for use as a relatively high frequency wave guide, rather than as an electrical power line, as in the present invention.

U.S. Pat. No. 3,356,785 issued to Yasuhisa Yoshida et al. on Dec. 5, 1967 discloses Electric Transmission Coaxial Cables generally along the lines of the Bain apparatus discussed above, i.e., having concentric inner and outer conductors, rather than an inner conductor and outer insulating tube or pipe, as in the present invention. The spacers between inner and outer conductors are specially configured, and are not "off the shelf" components as used in the present invention.

U.S. Pat. No. 3,639,864 issued to Bernt Klostermark on Feb. 1, 1972 discloses Transportable Coaxial Cable comprising alternating lengths of relatively flexible and rigid coaxial conductors. Again, the present invention has no external conductor, but comprises an internal conducting element and a substantially coaxial electrically insulating element. The present external insulator is relatively flexible and pliable throughout its length, while the internal electrical conductor is relatively rigid; these characteristics are substantially uniform throughout the conductor length, unlike the Klostermark coaxial conductor.

U.S. Pat. No. 4,047,166 issued to G. Kirby Miller on Sep. 6, 1977 discloses an Electrostatically Charged Cable Transducer comprising two flexible coaxial conductors loosely contained in an outer insulating tube. The two flexible conductors are unlike the single relatively rigid conductor of the present invention, and moreover the Miller coaxial conductors rest against the inner wall of the outer insulating tube, rather than being held substantially coaxially therein. The relative flexibility of the various elements is opposite that of the present invention, where the central conductor is relatively rigid and is housed in a relatively flexible insulating pipe or tube U.S. Pat. No. 5,094,735 issued to Donald C. Lang, Jr. on Mar. 10, 1992 discloses a Plating Workstation Support providing for the electrochemical insulation of a central conductor, while still providing for radial electrical connection to a plurality of plating clamps or hangars. The only similarity of the Lang, Jr. apparatus to the present invention is the use of polyvinyl chloride (pvc) tube for the outer insulator. The present conductor is devoid of any passages therethrough, and is preferably hermetically sealed to protect the inner conductor. The inner conductor is suspended by insulators in the present invention, rather than radially disposed conductors as in Lang, Jr. The central elongate conductor of Lang, Jr. is a solid bar with a dissimilar chemically relatively inert coating thereon, unlike the plurality of members in movable mechanical and electrical contact with one another, provided by the present invention. Almost none of the Lang, Jr. components are "off the shelf," as provided by the present invention.

U.S. Pat. No. 5,203,378 issued to David A. Williams on Apr. 20, 1993 discloses a High-Flexibility, Noncollapsing Lightweight Hose adapted for the transport of fluids; no electrical conductivity is disclosed. The hose is considerably more flexible than any component of the present invention, particularly the relatively rigid internal conducting member. Williams further discloses vent holes within inner coupling sleeves; the present invention provides continuous, unbroken walls in both the inner conducting element land the outer insulating element. None of the Williams elements may be considered a standard, "off the shelf" article, as used by the present invention.

Finally, U.S. Pat. No. 5,345,520 issued to Mark E. Grile on Sep. 6, 1994 discloses an Electrical Connector With An Optical Fiber Connection Detector. An optical fiber passes through the side of each electrical connector, to be matched up when the connectors are properly connected. The present invention does not provide for any other elements to enter the side wall of the conductor and extend through the interior of the conductor in any way. Moreover, the Grile device discloses only a solid insulator in direct physical contact with the interior conductor, and a passage through the side of the conductor for the optical fiber, unlike the unbroken walls of the elements of the present invention. Again, Grile uses a specially formed connector, rather than a combination of standard components as disclosed in the present invention.

None of the above noted patents, taken either singly or in combination, are seen to disclose the specific arrangement of concepts disclosed by the present invention.

SUMMARY OF THE INVENTION

By the present invention, an improved electrical power transmission line ills disclosed.

Accordingly, one of the objects of the present invention is to provide an improved electrical power transmission line which is particularly adapted to assembly and use in relatively remote and rugged terrain, and which utilizes standard components.

Another of the objects of the present invention is to provide an improved electrical power transmission line which comprises an inner conducting element and an outer insulating element, with the conducting and insulating elements being concentric and spaced apart from one another by a plurality of insulating spacers.

Yet another of the objects of the present invention is to provide an improved electrical power transmission line which inner conducting and outer insulating elements each are formed to have continuous and unbroken walls, with the outer insulating element being formed of a plurality of individual elongate tubular components hermetically sealed together and the inner conducting element being formed of a plurality of elongate components loosely jointed together to allow for thermal expansion and for the transmission of electrical current.

Still another of the objects of the present invention is to provide an improved electrical power transmission line which utilizes relatively flexible polyvinyl chloride pipe for the outer insulator and relatively rigid copper pipe for the inner conductor.

A further object of the present invention is to provide a method of constructing an improved electrical power transmission line according to the present invention.

A final object of the present invention is to provide an improved electrical power transmission lane for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
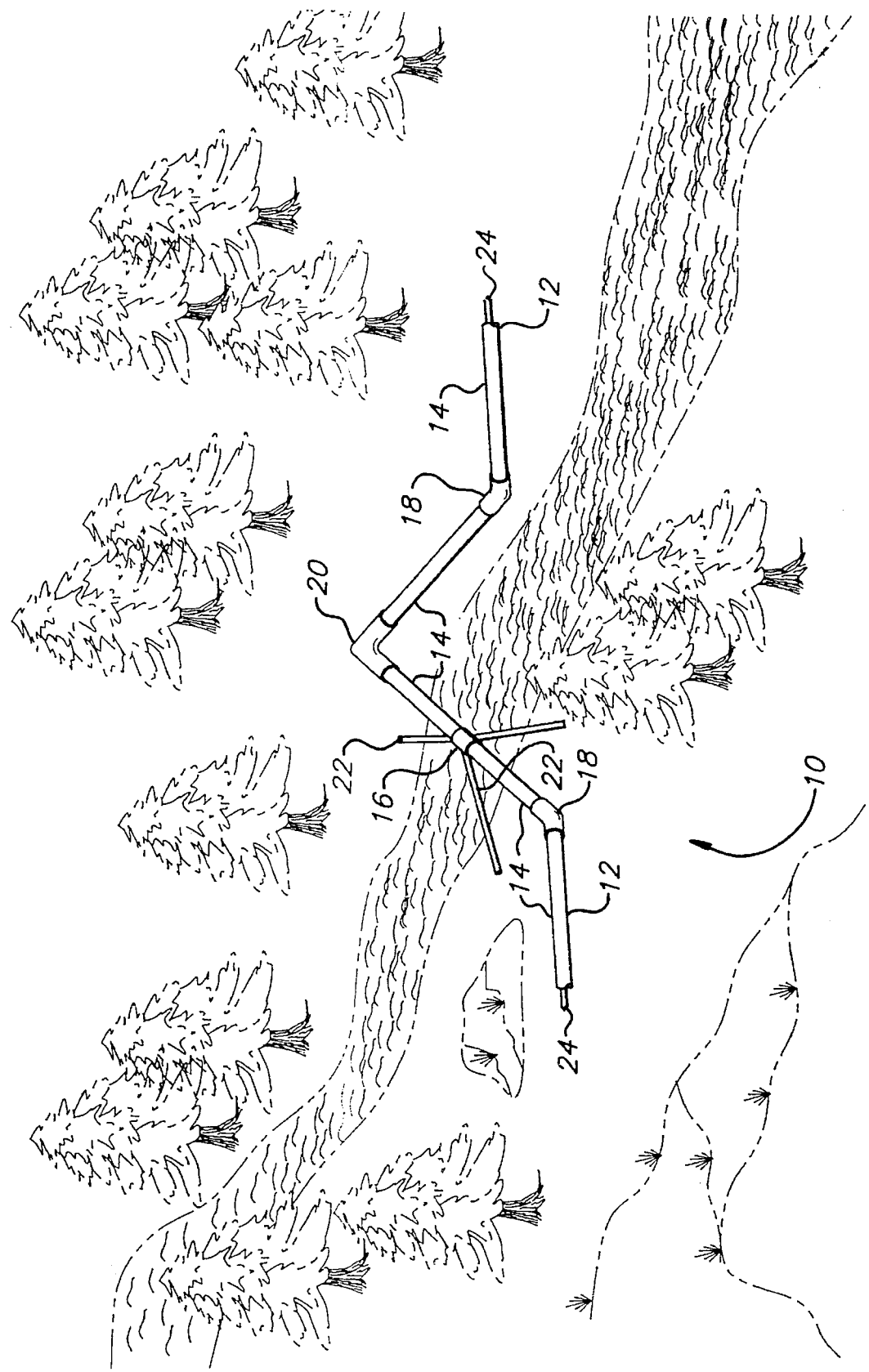
FIG. 1 is a perspective view of a portion of the electrical power transmission line of the present invention, showing typical features of its construction in rugged terrain.

Referring now particularly to FIG. 1 of the drawings, the present invention will be seen to relate to an electrical power transmission line 10, which is particularly adapted for installation and use across relatively rugged, remote and inaccessible terrain. (While only a relatively short length of the present transmission line 10 is shown in FIG. 1, it will be understood that the line 10 is of indeterminate length and may be made to any practicable length as required. The portion of the line 10 shown in FIG. 1 is sufficient Co display the various features of the outer insulating portion of the line 10.)

The outer portion 12 of the electrical power transmission line 10 is formed of electrically insulating pipe or tube components 14, which are joined together by mating connecting components, such as sleeves 16, 45 and 90 degree elbows 18 and 20, etc; it will be understood that other standard, off the shelf fittings and components may be used as required. Where it is necessary to elevate a portion of the line 10, one or more braces or compression struts 22 may be used to support that portion of the line 10. The same type of material, preferably a polyvinyl chloride plastic pipe, may be used for the bracing struts 22, as well as for the remainder of the outer electrically insulating components 12 through 18 of the transmission line 10. While other materials may be used for the outer electrical insulating portion, it has been found that the ease of assembly (using suitable solvent), the relative flexibility, light weight, ready availability, and resistance to temperature extremes often found in remote areas, makes such polyvinyl chloride pipe an extremely suitable material for the outer insulating portion 12 of the electrical line 10.

Figure 2:
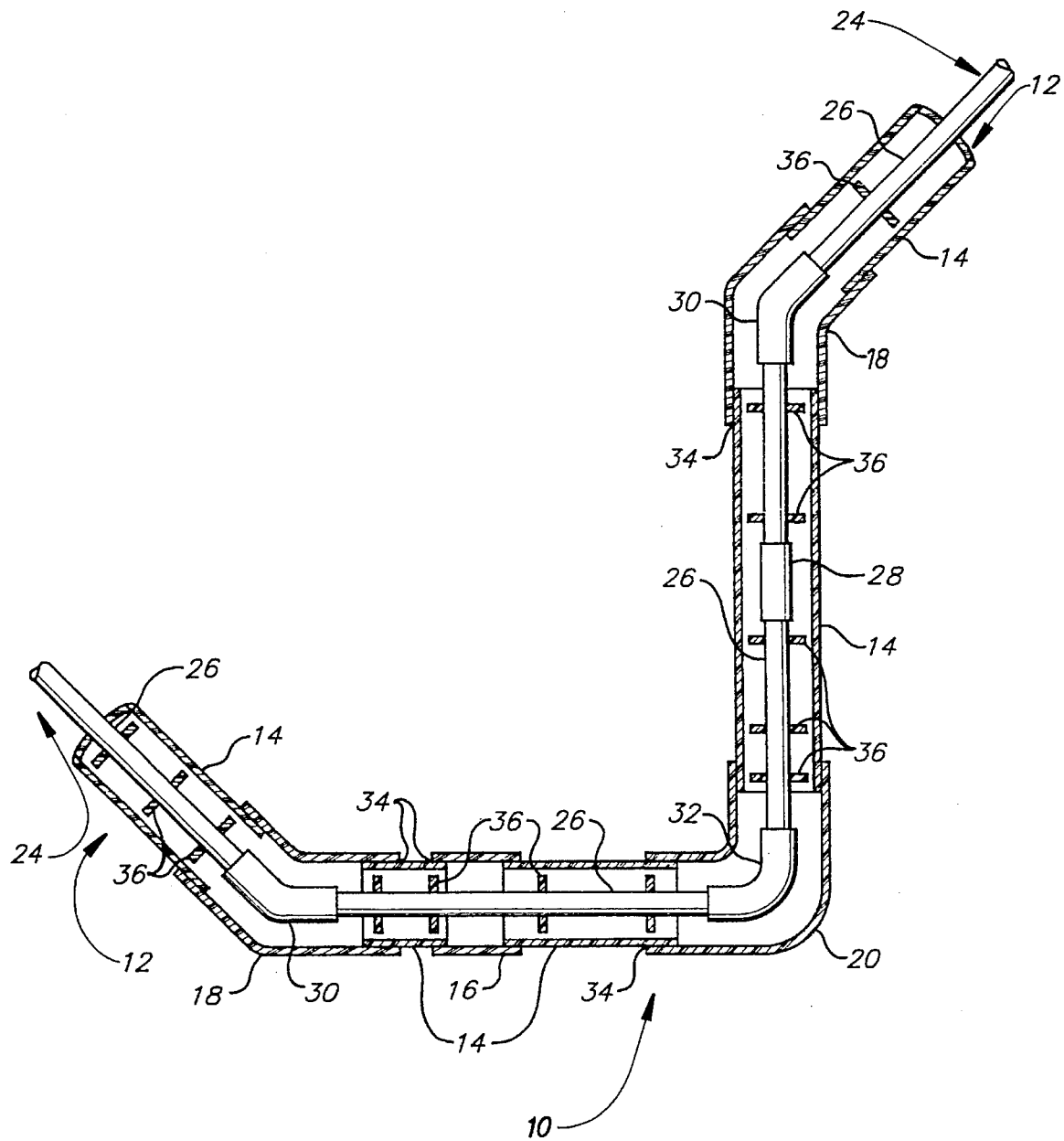
FIG. 2 is a plan view in section of the present electrical transmission line invention, showing details of its assembly and the relationship of components.

FIG. 2 discloses a partial cross sectional view of a typical portion of the present electrical power transmission line 10, in which half of the outer electrically insulating portion 12 is removed to show the inner, electrically conducting portion 24 and other features. The internal conducting portion 24 is formed similarly to the outer insulating portion 12, with a plurality of elongate conducting sections 26 and connecting components comprising sleeves 28 and 45 and 90 degree elbows 30 and 32, as well as other connecting components as required.

A conducting material with good electrical conductivity properties is preferred, as well as a material which components are readily available in relatively economical standard "off the shelf" configuration without need to manufacture components specially. While the electrical conductor may be formed of solid elongate components, such components as the connecting sleeves and elbows 28 through 32 are readily available for the assembly of copper pipe; hence, the use of mating hollow copper pipe for the elongate sections is desirable, to provide for ease of assembly with the connecting components. The copper pipe may be provided in a diameter to provide sufficient wall thickness to be equivalent to the desired cross sectional area of a standard solid wire conductor as required for the length of the transmission line 10 and other factors.

Preferably, the various electrically conductive components are assembled without, tightly securing the various joints, so that the elongate sections 26 may move within the connectors 28 through 32. This provision for movement allows for thermal expansion and contraction, as shown in FIG. 3 of the drawings and discussed in detail further below.

The outer insulating portion is preferably hermetically sealed at the various joint fittings, as at joints 34, by using a solvent compound therebetween to fuse and chemically weld the fittings together. This type of assembly results in an impermeable outer insulating portion 12 when properly accomplished, thus hermetically sealing the inner conductor portion 24 within the hollow outer insulator portion. This has the advantage of sealing out moisture and other contaminants land thus substantially reducing any corrosion, and resulting higher electrical resistance, which might occur at the various slip joints of the internal conductor portion 24 within the outer insulating portion 12.

Preferably, the inner conducting portion 24 of the present transmission line 10 is held in place substantially concentrically within the outer electrically insulating portion 12, in order to allow an equal amount of space surrounding the conductor 24 for thermal expansion and contraction relative to the outer insulator portion 12, as required. The use of a plurality of separated spacers 36 preferably formed of an electrically insulating material (e.g., flat polyvinyl chloride or other plastic sheet material) serves this function. The spacers 36 may be easily and quickly formed by cutting the sheet material into squares having a diagonal dimension slightly larger than the internal diameter of the outer insulating portion 12, and punching or otherwise forming a center hole in each sized to closely fit the outer diameter of the electrical conductor portion. These spacers 36 may then be slipped over the outside of the inner conductor 26, and pushed into the outer insulator 12 as required; the corners 58 will bend or fold to provide a tight fit within the outer insulator 12, as shown FIGS. 4 and 5, or may be trimmed as needed for a good fit.

Figure 3:
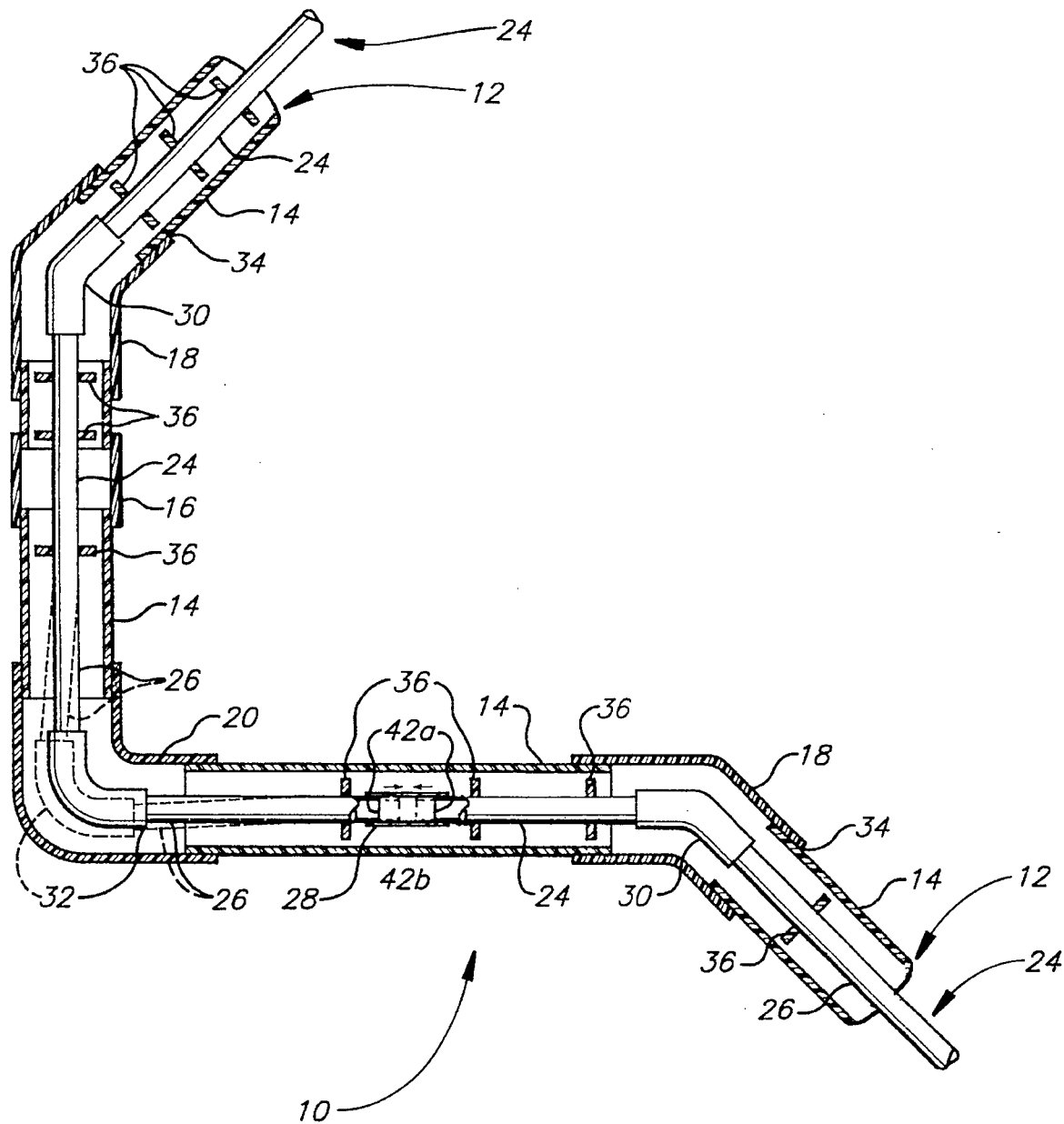
FIG. 3 is a detail plan view in section similar to portions of FIG. 2, showing the means allowing for relative movement between insulating and conducting components.
Figure 4:
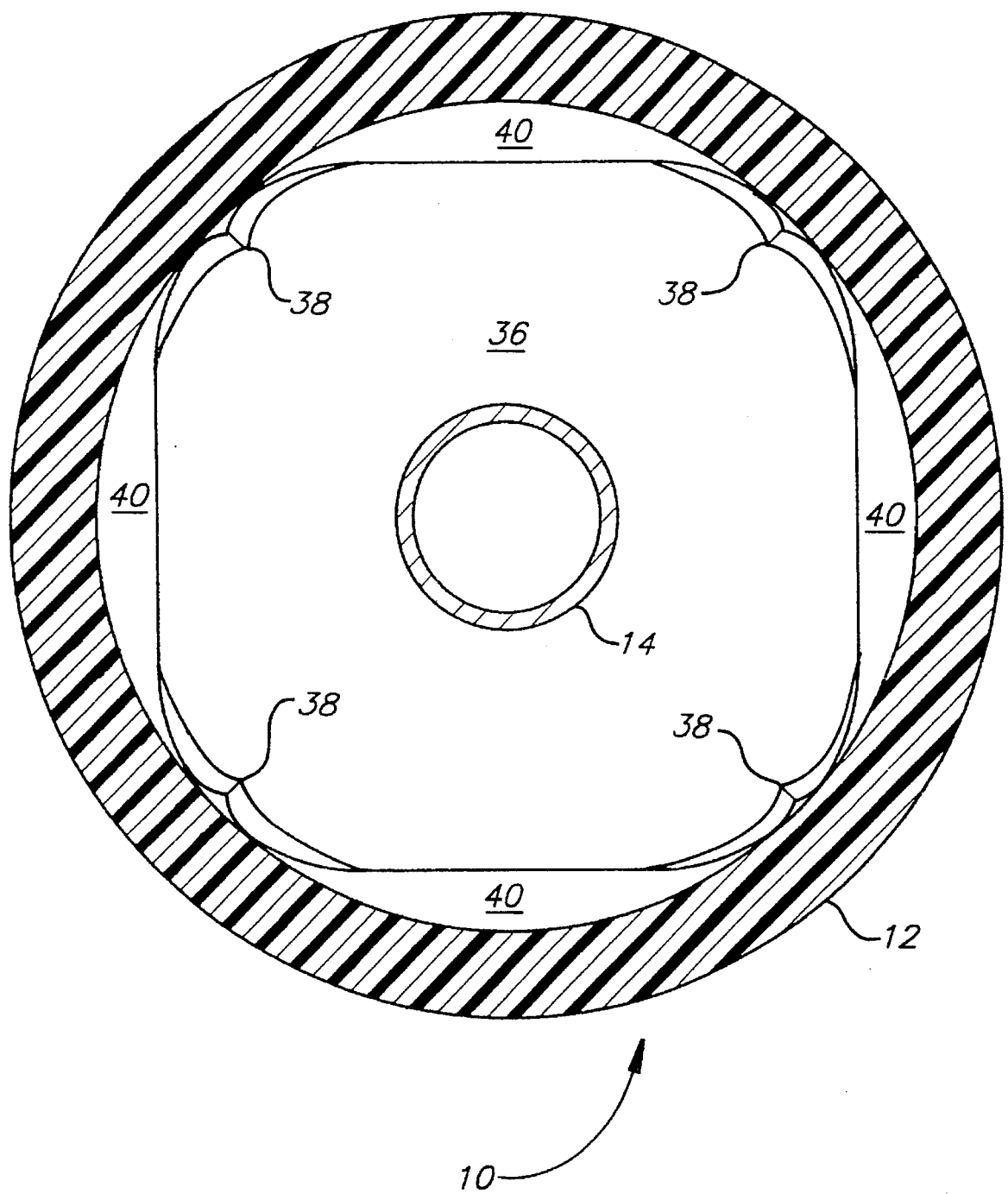
FIG. 4 is an elevation view in section of a typical portion of the present electrical transmission line showing further details for securing the conductor and insulator concentrically and spaced apart from one another.
Figure 5:
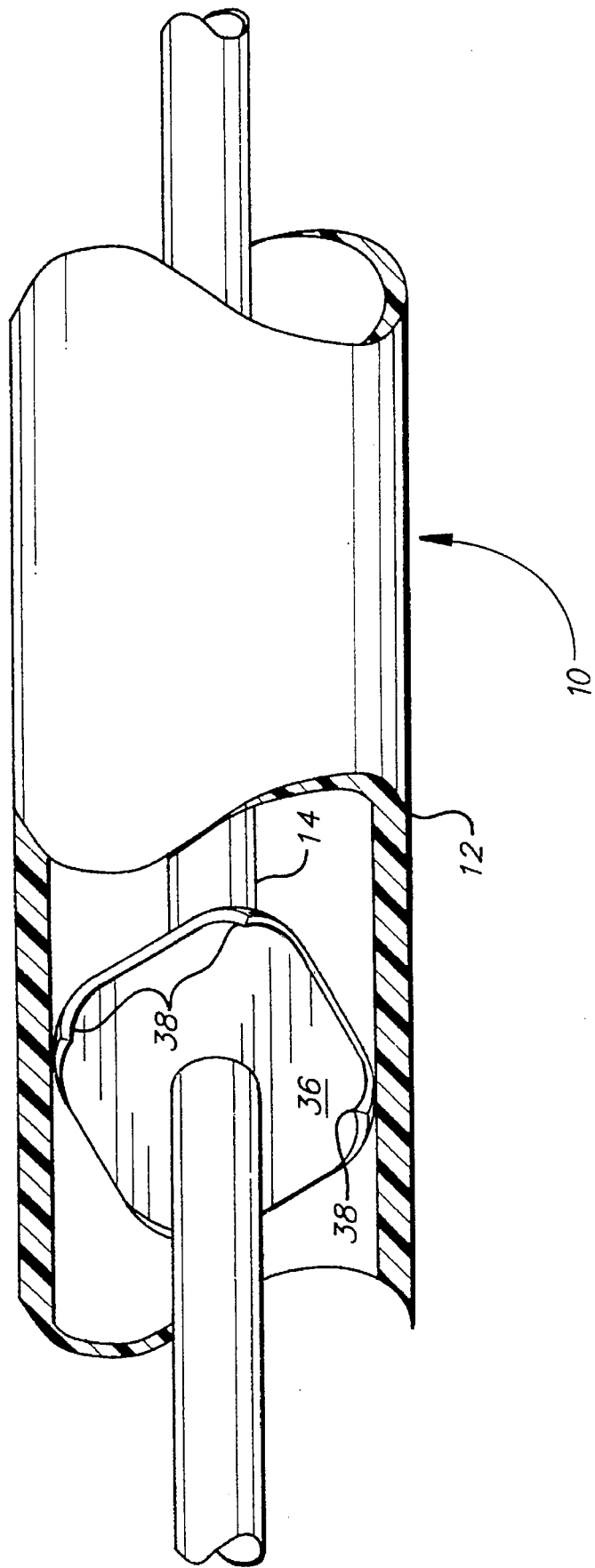
FIG. 5 is a perspective view partially in section, providing another view of the conductor and insulator spacing means.

The spacers 36 are shown in an assembled state in the partially sectioned views of FIGS. 2 and 3, and individually in detail in the sectioned views of FIGS. 4 and 5. It will be noted particularly in FIG. 4, that the spacers 36 are sized so that their corners 38 interfere with the internal wall of the outer insulating portion 12, as noted above, for a tight fit within the outer portion 12. However, these spacers 36 are nevertheless preferably sufficiently small so that their side dimensions are smaller than the internal diameter of the outer portion 12. Thus, a gap or air space 40 will remain between each side of each spacer 36, and the adjacent inner wall of the outer insulator 12, as shown in FIG. 4. This provision allows any air trapped within the outer insulator 12 to flow throughout the insulator tube 12, thus precluding any pressure buildup or differential between sections due to temperature changes or other reasons, which might otherwise distort or damage the outer insulator 12 or any of the spacers 36 therein.

Preferably, the spacers 36 are positioned sufficiently far from any major angular joints in the transmission line, to allow for some movement of the internal conductor portion 24 relative to the outer insulator 12, as shown in FIG. 3. The thermal coefficient of expansion of the conductor portion 24 will likely be greater than that of the surrounding insulating portion 12, as will be the case with a copper tube or pipe conductor and a polyvinyl chloride plastic insulator. The provision of movable or slip joint assemblies allows the inner conductor sections 26 to expand in length, as shown by the contracted ends 42a and expanded ends 42b within the sectioned conductor sleeve 28 in FIG. 3.

Additionally, the space around the conductor portion 24 within the surrounding insulator tube or pipe 12, allows movement at any elbow or other directional change of the assembly, as shown within the 90 degree insulator elbow 20 of FIG. 3. The two conductor sections 26 to either side of the 90 degree conductor elbow 32 are free to flex or bead to accommodate thermal expansion, and displace the 90 degree conductor elbow 32 within the outer insulator elbow 20, as shown by the broken lines indicating the displacement of the assembly due to thermal expansion. (It will be understood that the effect has been exaggerated in the drawings for clarity.) Thermal contraction will of course tend to flex or bend the conductor sections 26 in the opposite direction, hence the need to place the conductor portion 24 substantially concentrically within the outer insulator pipe or tube portion 12, to allow movement in any direction. These allowances for the movement of the internal conductor portion 24 not only allow for differential thermal expansion and contraction between the conductor 24 and insulator 12, but also accommodate the relative flexibility of the plastic outer insulator portion 12 relative to the metal pipe preferably used for the inner conductor portion 24.

In summary, the above described electrical power transmission line 10 will be seen to provide for an economically and easily assembled transmission line which may be readily constructed over relatively rugged and remote terrain. The use of readily available copper pipe sections and connectors for the internal conductor portion 24 and of readily available polyvinyl chloride or other plastic pipe sections and connectors for the outer insulator, provides for relatively easy transportation of such components to the back country and wilderness areas.

As such pipe and tube sections are readily available in relatively short lengths (e.g., 8, 10, 12 feet, etc.), such materials may be transported readily by air in larger single engine aircraft, as are commonly used for such back country transport. Float plane transport is viable means of transport, assuming the presence of a nearby lake or other body of water sufficiently large for takeoffs and landings; such geography is likely in the environment of the present invention. The assembly of the present electrical transmission line may be readily accomplished by a relatively unskilled crew with minimal tools; only appropriately sized pipe and tubing cutters and plastic solvent would be required for the construction of the present electrical transmission line. As both the inner conduct and the outer insulator are devoid of any holes or passages therethrough, the internal components are particularly well protected from corrosion or other adverse environmental effects. Accordingly, the use of the present electrical transmission line could accomplish much in the provision of electrical power from remote hydroelectric sites, which were uneconomical to develop prior to the present invention It is to be understood that the present invention is not limited to the sole embodiment described above, but encompasses any and all embodiments within the scope of the following claims.

I claim:

1. An electrical power transmission line, comprising: an electrical conductor including a plurality of interconnected individual elongate conducting sections and conducting section connectors;

an electrical insulator including a plurality of interconnected individual elongate rigid hollow insulating sections and insulating section connectors, said insulator surrounding said conductor; and a plurality of electrically insulating spacers disposed along said conductor, said spacers holding said conductor substantially concentrically within said insulator, hereby providing a gap between said conductor and said insulator.

2. The electrical power transmission line of claim 1 wherein:

said conductor is hollow and has an unperforated wall.

3. The electrical power transmission line of claim 1 wherein:

said insulator has an unperforated wall.

4. The electrical power transmission line of claim 1 wherein:

said conductor is more rigid than said insulator.

5. The electrical power transmission line of claim 1 wherein:

said conducting sections comprise metal pipes and said conducting section connectors comprise metal elbows and sleeves mating with said conducting sections, said conducting sections and said conducting section connectors being assembled to provide a movable fit between each of said conducting sections and said conducting section connectors to provide for thermal expansion of said conductor.

6. The electrical power transmission line of claim 5 wherein:

said conductor sections and said conducting section connectors are each formed of copper.

7. The electrical power transmission line of claim 1 wherein:

said insulating sections comprise plastic pipes and said insulating section connectors comprise plastic elbows and sleeves mating with said insulating sections, said insulating sections hermetically sealed to said insulating section connectors.

8. The electrical power transmission of line of claim 7 wherein:

said insulating sections and said insulating section connectors are each formed of polyvinyl chloride said insulating sections sealed to said insulating section connectors by means of a solvent liquid which fuses said insulating sections and said insulating section connectors together to form impervious joints therebetween.

9. The electrical power transmission line of claim 1 wherein:

each of said spacers is formed of a substantially flat sheet, said conductor passing through a substantially central hole in each of said spacers, said hole sized to provide a close fit for said conductor passing therethrough.

10. The electrical power transmission line of claim 9 wherein:

each of said spacers comprises substantially a square sheet of material including corners frictionally engaging said insulator, thereby immovably affixing said conductor substantially concentrically within said insulator.

11. The electrical power transmission line of claim 9 wherein:

each of said spacers is formed of plastic.

12. The electrical power transmission line of claim 11 wherein:

said plastic is polyvinyl chloride.

13. The electrical power transmission line of claim 1 including:

bracing means comprising at least one compression strut for providing support and bracing of said line.

14. The electrical power transmission line of claim 13 wherein:.

said bracing means is formed of polyvinyl chloride pipe.

15. A method of constructing an electrical power transmission line, comprising the following steps:

(a) providing a plurality of individual elongate electrically conducting sections and connectors therefor, and assembling an electrical conductor inner portion therefrom;

(b) providing a plurality of individual elongate electrically insulating hollow sections and hollow connectors therefor and assembling a hollow electrical insulator outer portion therefrom;

(c) providing a plurality of electrically insulating spacers adapted to be placed over the electrical conductor inner portion and within the electrical insulator outer portion, and assembling the spacers on the electrical conductor inner portion in a separated array, and;

(d) assembling the electrically conductive inner portion with the spacers thereon substantially concentrically within the electrically insulating outer portion, thereby providing an electrical transmission power line.

16. The method of constructing an electrical power transmission line according to claim 15, including the step of:

providing a movable fit between each of the elongate electrically conducting sections and connectors therefor, thereby allowing for thermal expansion of the assembled electrically conductive inner portion within the electrically insulating outer portion of the electrical power transmission line.

17. The method of constructing an electrical power transmission line according to claim 15, including the step of:

hermetically sealing each of the electrically insulating hollow sections and hollow connectors therefor together, thereby sealing the electrical conductor inner portion therein.

18. The method of constructing an electrical power transmission line according to claim 15, including the step of:

providing bracing means comprising at least one compression strut for the transmission line, as required.

\* \* \* \* \*